US005260140A

United States Patent [19]

Malhotra

[11] Patent Number: 5,260,140

[45] Date of Patent: * Nov. 9, 1993

[54] TRANSPARENCIES

[75] Inventor: Shadi L. Malhotra, Mississauga, Canada

[73] Assignee: Xerox Corporation, Stamford, Conn.

[ * ] Notice: The portion of the term of this patent subsequent to Aug. 18, 2009 has been disclaimed.

[21] Appl. No.: 873,262

[22] Filed: Apr. 24, 1992

Related U.S. Application Data

[63] Continuation of Ser. No. 370,677, Jun. 23, 1989, Pat. No. 5,139,903.

[51] Int. Cl.[5] .......................... B32B 9/00; G03C 3/00

[52] U.S. Cl. .................................. 428/507; 428/195; 430/18

[58] Field of Search ........................ 430/18, 206, 216; 428/195, 507

[56] References Cited

U.S. PATENT DOCUMENTS 4,756,966 7/1988 Kinsman et al. .................... 430/206
5,139,903 8/1992 Malhotra .............................. 430/18

*Primary Examiner*—John Goodrow
*Attorney, Agent, or Firm*—E. O. Palazzo

[57] ABSTRACT

An imaged transparency comprised of a supporting substrate, oil absorbing layers comprised of, for example, chlorinated rubber, styrene-diene copolymers, alkylmethacrylate copolymers, ethylene-propylene copolymers; sodium carboxymethyl cellulose, or sodium carboxymethylhydroxyethyl cellulose; and ink receiving polymer layers comprised of, for example, vinyl alcohol/vinyl acetate, vinyl alcohol/vinyl butyral, or vinyl alcohol/vinyl acetate/vinyl chloride copolymers. The ink receiving layers may include therein, or thereon fillers such as silica, calcium carbonate, titanium dioxide.

14 Claims, No Drawings

TRANSPARENCIES

This is a continuation, of application Ser. No. 370,677, filed Jun. 23, 1989 now U.S. Pat. No. 5,139,903.

BACKGROUND OF THE INVENTION

This invention relates generally to transparencies, and more specifically the present invention is directed to transparencies, that is a transparent substrate fim for receipt of a toner image and the resulting image transparency, containing an oil absorbing polymer with an ink receiving layer thereon, and the use of these transparencies in Dot Matrix printers such as the commercially available Roland PR-1012. Thus, in one embodiment, the present invention relates to transparent substrates for receipt of a toner image comprised of a supporting substrate, an oil absorbing polymer, on one or both sides thereof, and an ink receiving polymer thereover, which polymer can be present on one or both (two) sides or exposed horizontal surfaces of the oil absorbing layer.

Single strike ribbons for Dot Matrix printers comprised of a fabric such as nylon, a polyester, or silk doped with mineral or vegetable oil-based dyes are known. Also, known are multistrike ribbons which are comprised of blends of carbon black and rape seed oil, reflex blue pigment, and lecithin as a surfactant. The aforementioned inks are, for example, difficult to dry on conventional transparencies, and therefore require specially coated polyester transparencies when selected for overhead projectors. The aforementioned disadvantage is avoided with the transparencies of the present invention. Other advantages associated with the transparencies in many embodiments of the present invention include high optical densities of, for example, from about 0.9 to about 1.15, and images thereon that dry in less than 60 seconds.

Transparencies, including typewriter ribbon transparencies, are known, reference for example U.S. Pat. Nos. 3,002,858; 4,379,804; 4,461,793; 4,474,850; 4,503,111; 3,790,435; 4,233,354 and 4,301,195. More specifically, there is illustrated in U.S. Pat. No. 4,301,195 a transparent sheet material comprised of a transparent backing having an ink receptive stratum thereon containing, for example, a mixture of two polymers, or individual layers of each polymer. One of the aforementioned selected polymers is obtained by the reaction of an epoxidized water insoluble neutral rubbery polymer and a water soluble secondary monoamine, reference the Abstract of the Disclosure. In the '858 patent, the disclosure of which is totally incorporated herein by reference, there is illustrated an ink receptive coating composition capable of receiving a typewritten image, wherein there can be selected as a coating ethyl cellulose, and a substrate such as Mylar. Reference to column 1, line 12, of this patent indicates that the plastics referred to, upon which it is intended to present images, include transparent, translucent, or opaque sheets, and laminated structures. Also, in the aforementioned '354 patent, there are illustrated printed polyester films with certain properties; and containing on its surface a well adhering printed layer formed by a printing ink with a cellulose derivative as a binder. In the '435 patent, there is described synthetic writing paper comprised of a Mylar base, and a coating thereover including poly(styrene).

Other transparencies similar to those illustrated in the 4,301,195 patent are disclosed in U.S. Pat. Nos. 4,474,850 and 4,503,111. Furthermore, there are disclosed in U.S. Pat. No. 4,461,793 coatings that can be applied to a heat shrinkable base material which is capable of forming a printing layer thereon. Specifically, in column 2, line 1, of this patent there is illustrated a printable coating useful for application to heat shrinkable identification devices containing a polyester film, calcium carbonate, and a silicate compound. Apparently, the heat shrinkable base material of the '793 patent is useful as a receiver for typewritten images.

Furthermore, in U.S Pat. No. 4,701,367, the disclosure of which is totally incorporated herein by reference, there is described a typewriter transparency with, for example, a supporting substrate and thereover a coating blend selected from the group consisting of (1) poly(vinyl methyl ether), and poly(styrene); (2) poly(vinyl methyl ether), poly(styrene) and poly(ethyl acrylate); (3) a styrene-(ethylene-butylene)-styrene triblock copolymer; (4) poly(vinyl acetate), and poly(vinyl isobutylether); (5) a styrene-butadiene-styrene triblock copolymer; (6) poly(vinyl methyl ether), poly(vinyl acetate), and poly(ethylacrylate); (7) poly(hexyl methacrylate) and poly(ethyl methacrylate), and other coatings.

There is disclosed in U.S. Pat. No. 4,446,174 an ink jet recording method for producing a recorded image on an image receiving sheet with aqueous inks, and wherein an ink jet is projected onto an image receiving sheet comprising a surface layer containing a pigment, which surface layer is capable of adsorbing a coloring component present in the aqueous ink. Also, there is disclosed in U.S. Pat. No. 4,371,582 an ink jet recording sheet containing a latex polymer, which can provide images having excellent water resistance properties and high image density by jetting them onto an aqueous ink containing a water soluble dye. Similarly, U.S. Pat. No. 4,547,405 describes an ink jet recording sheet comprising a transparent support with a layer comprising 5 to 100 percent by weight of a coalesced block copolymer latex of poly(vinyl alcohol) with polyvinyl(benzyl ammonium chloride), and 0 to 95 percent by weight of a water soluble polymer selected from the group consisting of poly(vinyl alcohol), poly(vinyl pyrrolidone), and copolymers thereof.

Other coatings for ink jet transparencies include blends of carboxylated polymers with poly(alkylene glycol), reference U.S. Pat. No. 4,474,850; blends of poly(vinyl pyrrolidone) with matrix forming polymers such as gelatin; or poly(vinyl alcohol) swellable by water and insoluble at room temperature but soluble at elevated temperatures, reference U.S. Pat. No. 4,503,111; and blends of poly(ethylene oxide) with carboxymethyl cellulose as illustrated in U.S. Pat. No. 4,592,954, the disclosure of which is totally incorporated herein by reference. In the aforementioned 4,592,954 patent, there are mentioned U.S. Pat. Nos. 4,273,602; 4,370,379 and 4,234,644. Disclosed in the '602 patent are heat sensitive recording materials comprised of a support sheet of a thickness of from 5 to 40 microns containing thereon a heat sensitive transfer layer with a phenolic material, a colorless or precolored component which reacts with the phenolic to form a color upon application of heat, and a heat fusible material with a melting point of 40° to 150° C. It is indicated in this patent that heat sensitive transfer layers can be formed from waxes, or resins of a low molecular weight with colored dyes dispersed therein; however, apparently there are problems associated with such a method in that part of the layer transfers to ordinary paper causing undesirable staining and a decrease in contrast between the letters and the background. Accordingly, the recorded letters cannot be easily read, a disadvantage avoided with the transparencies of the present invention.

Also known is the preparation of transparencies by electrostatic means, reference U.S. Pat. No. 4,370,379, wherein there is described the transferring of a toner image to a polyester film containing, for example, a substrate and a biaxially stretched poly(ethylene terephthalate) film, including Mylar. Moreover, in U.S. Pat. No. 4,234,644 there is disclosed a composite lamination film for electrophoretically toned images deposited on a plastic dielectric receptor sheet comprising in combination an optically transparent flexible support layer, and an optically transparent flexible intermediate layer of a heat softenable film applied to one side of the support; and therein the intermediate layer possesses good adhesion to the support.

There were listed in a patentability search report the following prior art:

U.S. Pat. No. 4,713,280, the disclosure of which is totally incorporated herein by reference, discloses a transparent sheet capable of receiving oil-based inks from impact ink transfer printers that use fabric ribbon. The ink receptive layer may comprise polyvinyl butyral and a particulate material such as amorphous silicon for better ink retention; U.S. Pat. No. 4,269,891 discloses a transparency with an ink absorbing layer containing a number of white pigments such as silica and titanium dioxide. A binder layer of the transparency is comprised of polyvinyl alcohol; U.S. Pat. No. 4,474,850 discloses a polyester film (Mylar type) coated with vinyl acetates containing pigments such as silica, zinc oxide and calcium carbonate for better ink retainment; U.S. Pat. No. 4,701,367 presented hereinbefore; and U.S. Pat. No. 4,781,985 discloses an ink jet transparency coating comprising polyvinyl pyrrolidone/polyvinyl acetate copolymer.

Although the transparencies illustrated in the prior art are believed to be suitable for their intended purposes, there remains a need for other transparencies containing developed images that are useful for oil based ribbons, and that will enable the formulation of images with high optical densities. Additionally, there is a need for transparencies containing developed images with an oil absorbing polymer layer that are compatible with ink compositions, including those compositions selected for Dot Matrix printers, and particularly those derivable from blends of carbon black with rape seed oil, reflex blue pigment and lecithin components. There is also a need for transparencies containing developed images that enable the rapid drying of inks, and wherein, subsequent to drying, image smearing is avoided, or substantially minimized. Another need of the present invention resides in providing transparencies with coatings that do not block (stick) at, for example, 50 percent relative humidity and at a temperature of 50° C. in many embodiments.

SUMMARY OF THE INVENTION

It is an object of the present invention to provide transparencies with many of the advantages illustrated herein.

Another object of the present invention resides in the provision of Dot Matrix image transparencies with an oil absorbing polymer and an ink receiving layer, or layers receiving polymer.

Also, in another object of the present invention there are provided image transparencies enabling images with high optical densities.

Further, in another object of the present invention there are provided image transparencies that enable developed images with rapid drying times, that is for example from about 30 seconds to about 60 seconds.

Furthermore, in another object of the present invention there are provided image transparencies that can be selected for Dot Matrix printers and wherein, for example, the characters or images thereon are substantially smudge resistant.

Moreover, another object of the present invention resides in Dot Matrix image transparencies that have substantial permanence for extended time periods.

Another object of the present invention relates to image transparencies with specific coatings which enable reflex blue pigment and rape seed oil absorption from the inks selected in a rapid manner, thereby enabling such coatings to be particularly useful in known Dot Matrix printers.

These and other objects of the present invention are accomplished by providing transparencies and opaque plastics, which plastics are comprised of, for example, a supporting substrate, an oil absorbing polymer and an ink receiving layer with fillers such as titanium dioxide, silicas or mixtures thereof. More specifically, in accordance with one embodiment of the present invention there are provided Dot Matrix image transparencies which are compatible with the inks selected for marking, and wherein the transparencies enable acceptable optical density images to be obtained. Specifically, in one embodiment of the present invention there are provided transparencies including transparent substrate films for receipt of a toner image, and the resulting image transparency comprised of a supporting substrate, such as a polyester; an oil absorbing polymer, preferably present on both sides of the supporting substrate, such as hydrophobic polymers including styrene-diene star (a branched rather than a linear structure), block copolymers, styrene-butadiene triblock copolymers, styrene-(ethylene butylene)-styrene triblock copolymers, ethylene-propylene elastomers, styrene-butyl methacrylate and alkylmethacrylate copolymers, chlorinated rubber, hydrophilic sodium carboxymethyl cellulose and its derivatives, such as sodium carboxymethylhydroxyethyl cellulose; and an ink receiving layer thereover, preferably present on both sides of the oil absorbing layer, comprised of hydrophilic/hydrophobic segments containing copolymers such as vinyl alcohol/vinyl acetate, preferably with a vinyl alcohol content of from about 5 to about 25 percent by weight, vinyl alcohol/vinyl butyral, preferably with a vinyl alcohol content of from about 5 to about 30 percent by weight, and vinyl alcohol/vinyl acetate/vinyl chloride, preferably with a vinyl alcohol content of from about 5 to about 25 percent by weight, vinyl acetate content of from about 3 to about 10 percent by weight, and a vinyl chloride content of from about 92 to about 65 percent by weight, and the like. The ink receiving layer can also contain therein or thereon filler components such as colloidal silicas, calcium carbonate and titanium dioxide.

One specific embodiment of the present invention is directed to image transparencies for Dot Matrix printers, which transparencies are comprised of a supporting substrate such as a polyester, an oil absorbing polymer layer of styrene-(ethylene butylene)-styrene triblock copolymer with a styrene content of 29 percent by weight in a thickness of about 2 to about 10 microns and an ink receiving layer thereover of a hydrophilic/hydrophobic segment (for example in a vinyl alcohol/vinyl acetate copolymer the vinyl alcohol is hydrophilic, the vinyl acetate is hydrophobic, in vinyl alcohol/vinyl butyral copolymer vinyl alcohol is hydrophilic/vinyl butyral is hydrophobic) containing a copolymer of vinyl alcohol/vinyl acetate in a thickness of from about 1 to about 5 microns. The aforementioned porous transparencies of the present invention yield higher optical density images, for example, black from about 0.95 to about 1.0, than those obtained on nonporous single layer structure transparencies produced by coatings of styrene-(ethylene butylene)-styrene triblock copolymers alone (black from about 0.65 to 0.70) of U.S. Pat. No. 4,701,367 or hydrophobic ethyl cellulose coatings (black of 0.58) of U.S. Pat. No. 3,002,858. In the two layered porous image transparencies of the present invention, the ink components of ribbons used in Dot Matrix printers such as carbon black, rape seed oil, lecithin and reflex blue pigment evidence a chromatographic separation where carbon black is embedded in the top ink receiving layer, and the rape seed oil and reflex blue pigment migrate to the oil absorbing layer. The net effect of this phenomenon is a more efficient and effective spread of the colorants on the coating structure thereby providing higher optical density images of from about 0.9 to about 1.15. The images on styrene-(ethylene butylene)-styrene triblock copolymers alone or on ethyl cellulose coatings do not, it is believed, spread properly and hence yield low optical density images.

The presence of chromatographic separation of colorants on the two layered-structure imaged transparencies of the present invention can be demonstrated with scotch tape. The aforementioned two layered transparencies of the present invention were printed with square test patterns using a Roland PR-1012 Dot Matrix printer. The optical densities of the resulting images ranged between about 0.90 to about 1.15. These images were tested for their fix using scotch tape to lift off the images. The optical densities of the remaining image were measured and found to be between about 0.60 to about 0.65 and the images were blue in color, it is believed, because of the presence of reflex blue pigment. A similar test was performed on transparencies coated with styrene-(ethylene butylene)-styrene triblock copolymer alone and imaged with square test patterns using a Roland PR-1012 Dot Matrix printer. The optical densities of these images were (about 0.65 to about 0.70). These images were lifted off with scotch tape. The optical densities of the remaining images were between about 0.50 to about 0.55 and the images had faint black color. Replacing the transparency coating of styrene-(ethylene butylene)-styrene triblock copolymer with ethyl cellulose yielded images which had optical densities of about 0.58 to about 6.0 prior to lift off and about 0.45 after the scotch tape test; the color of the remaining images was faint black.

Specific examples of substrates or base layers with a thickness of from about 50 microns to about 125 microns, and preferably of a thickness of from about 75 microns to about 100 microns that may be selected for the image transparencies of the present invention include Mylar, commercially available from E. I. DuPont; Melinex, commercially available from Imperials Chemical, Inc.; Celanar, commercially available from Celanese; polycarbonates, especially Lexan; polysulfones; cellulose triacetate; polyvinylchlorides; and the like, with Mylar being particularly preferred in view of its availability and lower costs.

Specific examples of oil absorbing layers of an effective thickness, for example, of from about 2 to about 10 microns and in contact with the supporting substrate include styrene-(ethylene butylene)-styrene triblock copolymers with a styrene content of 29 percent by weight (available as Kraton G from Shell Chemical Company), styrene-butadiene star block (available as Cariflex from Shell Chemical Company), styrene-butadiene triblock copolymer with a styrene content of 38 percent by weight (available from Shell Chemical Company), ethylene-propylene (TPR Uniroyal Company), styrene-butylmethacrylate copolymers with a styrene content of 50 percent by weight (Scientific Polymer Products), alkylmethacrylate copolymers (Acryloid B-72, B-82 available from Rohm and Hass), 65 percent chlorinated rubber (Scientific Polymer Products), sodium carboxymethyl cellulose (CMC7LF) (available from Hercules Chemical Company), and sodium carboxymethylhydroxyethyl cellulose (CMHEC 43H, 37L, available from Hercules Chemical Company). -CMHEC 43H is believed to be a high molecular weight polymer with a carboxymethyl cellulose (CMC)/hydroxyethyl cellulose (HEC) ratio of 4/3; CMHEC 37L is a low molecular weight polymer with a CMC/HEC ratio of 3/7, and the like. Preferred oil absorbing polymers include chlorinated rubber as well as styrene-diene copolymer since these are readily available and possess excellent properties for oil absorption.

Illustrative examples of ink receiving layers of, for example, a thickness of from about 1 to about 5 microns and in contact with the oil absorbing layer include copolymers of vinyl alcohol/vinyl acetate, preferably with a vinyl alcohol content of 18 percent by weight (available from Scientific Polymer Products), vinyl alcohol/vinyl butyral, preferably with a vinyl alcohol content of 19.5 percent by weight (Scientific Polymer Products), vinyl alcohol/vinyl acetate/vinyl chloride, preferably with a vinyl alcohol content of 15 percent by weight, vinyl acetate content of 5 percent by weight and vinyl chloride content of 80 percent by weight (Scientific Polymer Products), and the like, with the preferred layer being comprised of the copolymer of vinyl alcohol/vinyl acetate primarily because of its high performance, that is images with optical density of 1.0 can be obtained.

The ink receiving layer may contain filler components as indicated herein in various effective amounts such as, for example, from about 2 to about 25 weight percent. Examples of fillers include colloidal silicas present, for example, in one embodiment in an amount of 5 weight percent-(available as Syloid 74 from W. R. Grace Company), calcium carbonate, titanium dioxide (Rutile), and the like.

The aforementioned two layered structure polymer coatings can be present on the supporting substrates, such as Mylar, or paper in various thicknesses depending on the coatings selected and the other components utilized; however, generally the total thickness of the polymer coatings is from about 3 to about 15 microns, and preferably from about 7 to about 10 microns. Moreover, these coatings can be applied by a number of known techniques including reverse roll, extrusion and dip coating processes. In dip coating, a web of material to be coated is transported below the surface of the coating material by a single roll in such a manner that the exposed site is saturated, followed by the removal of any excess by a blade, bar or squeeze rolls. With reverse roll coating, the premetered material is transferred from a steel applicator roll to the web material moving in the opposite direction on a backing roll. Metering is performed in the gap precision ground chilled iron rolls. The metering roll is stationary or is rotating slowly in the opposite direction of the applicator roll. Also, in slot extrusion coating there is selected a flat die to apply coating materials with the die lips in close proximity to the web of material to be coated. Once the desired amount of coating has been applied to the web, the coating is dried at 70° to 100° C. in an air dryer.

In one specific process embodiment, the Dot Matrix image transparencies of the present invention are prepared by providing a Mylar substrate in a thickness of from about 75 to about 100 microns, and applying to each side of the Mylar by dip coating processes, in a thickness of from about 2 to about 10 microns, an oil absorbing layer polymer such as a styrene-(ethylene butylene)-styrene triblock copolymer with styrene content of 29 percent by weight. Thereafter, the coating is air dried at 25° C. for 60 minutes and the resulting transparency is subsequently dip coated on both sides with an ink receiving layer comprised, for example, of a copolymer of vinyl alcohol/vinyl acetate in a thickness of from about 1 to about 5 microns. Coating is affected from a mixture of toluene or other similar solvent, 70 percent by weight, and 1-butanol or other alcohol, 30 percent by weight, which mixture was present in a concentration of 3 percent by weight. Thereafter, the coating is air dried and the resulting layered structure transparency can be utilized in a Dot Matrix printer, such as those commercially available from Roland PR-1012, enabling transparencies with images thereon.

The optical density measurements recited herein, including the working Examples, were obtained on a Pacific Spectrograph Color System. The system consists of two major components: an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters, and the entry of tristimulus values; and an alphanumeric keyboard for entry of product standard information.

The following examples are being supplied to further define specific embodiments of the present invention, it being noted that these examples are intended to illustrate and not limit the scope of the present invention. Parts and percentages are by weight unless otherwise indicated.

EXAMPLE I

There were prepared 10 coated transparency Mylar sheets of a thickness of 100 microns by affecting a dip coating of these sheets, both (two) sides for each sheet, (10) into a coating solution containing a chlorinated (65 weight percent) rubber, obtained from Scientific Polymer Products, which solution was present in a concentration of 4 percent by weight in toluene. Subsequent to air drying for 60 minutes at 25° C. in a fume hood equipped with an adjustable volume exhaust system and monitoring the difference in weight prior to and subsequent to coating, the coated sheets had present on each side 400 milligrams, 5 microns in thickness, of the chlorinated rubber polymer. These sheets (10) were then coated on both sides with an ink receiving layer by affecting a dip coating of the sheets into a solution of vinyl alcohol/vinyl acetate copolymer with a vinyl alcohol content of 18 percent by weight, which solution was present in a concentration of 3 percent by weight of a mixture of toluene (70 percent by weight) and 1-butanol (30 percent by weight). Subsequent to air drying for 60 minutes at 25° C., and monitoring the difference in weight prior to and subsequent to coating, the coated sheets had present on each side 300 milligrams, 3 microns in thickness, of the ink receiving layer of a copolymer vinyl alcohol/vinyl acetate in contact with chlorinated rubber. These sheets were than fed into a Roland PR-1012 Dot Matrix printer having incorporated therein a black cloth ribbon doped with an ink believed to be comprised of carbon black, the surfactant lecithin, reflex blue pigment and rape seed oil, and there were obtained transparency sheets with images with an average optical density (that is the sum of the optical densities of the 10 sheets divided by 10) of 1.0.

EXAMPLE II

There were prepared 10 coated transparency Mylar sheets of a thickness of 100 microns by affecting a dip coating both (two) sides of these sheets (10) into a coating solution of styrene-(ethylene butylene)-styrene triblock copolymer with styrene content of 29 percent by weight which solution was present in a concentration of 4 percent by weight in toluene. Subsequent to air drying for 60 minutes at 25° C. in a fume hood equipped with adjustable volume exhaust system and monitoring the difference in weight prior to and subsequent to coating these dried coated sheets had present on each side 400 milligram, 4 microns in thickness, of the triblock polymer oil absorbing layer. The sheets were further coated on both sides of the aforementioned oil absorbing triblock layers with a copolymer of vinyl alcohol/vinyl butyral with a vinyl alcohol content of 19.5 percent by weight which solution was present in a concentration of 3 percent by weight of a mixture of toluene (60 percent by weight) and 1-butanol (40 percent by weight). Subsequent to air drying for 60 minutes at 25° C. in a fume hood equipped with adjustable volume exhaust system and monitoring the difference in weight prior to and subsequent to coating, these dried coated sheets had present on each side 300 milligram, 3.5 microns in thickness, of the vinyl alcohol/vinyl butyral copolymer in contact with styrene-(ethylene butylene)-styrene copolymer. These sheets were then fed into a Roland PR-1012 Dot Matrix printer and there were obtained transparency sheets containing images thereon with an average optical density of 0.95.

EXAMPLE III

There were prepared by repeating the procedure of Example II 10 coated opaque plastic Mylar sheets of a thickness of 100 microns by affecting a dip coating of these sheets into a coating solution of sodium carboxymethylhydroxyethyl cellulose polymer (CMHEC 37L) which solution was present in a concentration of 4 percent by weight in water. Subsequent to air drying for 60 minutes at 25° C. in a fume hood equipped with adjustable volume exhaust system and monitoring the difference in weight prior to and subsequent to coating, these dried coated sheets had present on each side 400 milligrams, 5 microns in thickness, of the polymer. These sheets were then coated with an ink receiving layer of a blend of vinyl alcohol/vinyl acetate/vinyl chloride terpolymer (with vinyl alcohol content of 15 percent by weight, vinyl acetate content of 5 percent by weight, vinyl chloride content of 80 percent by weight), 75 percent by weight, colloidal silica filler 10 percent by weight, titanium dioxide filler 15 percent by weight, which blend was present in a concentration of 5 percent by weight in acetone. Subsequent to air drying for 60 minutes at 25° C. in a fume hood equipped with adjustable volume exhaust system and monitoring the difference in weight prior to and subsequent to coating, these dried coated sheets had present on each side 250 milligrams, 3 microns in thickness, of the terpolymer vinyl alcohol/vinyl acetate/vinyl chloride in contact with the oil absorbing layer sodiumcarboxymethylhydroxyethyl cellulose. These sheets were then fed into a Roland PR-1012 Dot Matrix printer and there were obtained sheets with images thereon with an average optical density of 1.15.

Other modifications of the present invention will occur to those skilled in the art subsequent to a review of the present disclosure, and these modifications, including equivalents thereof, are intended to be included within the scope of this invention.

What is claimed is:

1. A transparent substrate material for receiving or containing a toner image comprised of a supporting substrate, an oil absorbing layer comprised of (1) halogenated rubber; (2) styrene-diene copolymers; (3) alkyl methacrylate copolymers; (4) ethylene-propylene copolymers; (5) sodium carboxymethyl cellulose; or (6) sodium carboxymethylhydroxyethyl cellulose, and an ink receiving layer.

2. A transparent substrate material for receiving or containing a toner image comprised of a supporting substrate, an oil absorbing polymer layer present on both sides of the substrate and comprised of (1) halogenated rubber; (2) styrene-diene copolymers; (3) alkyl methacrylate copolymers; (4) ethylene-propylene copolymers; (5) sodium carboxymethyl cellulose; or (6) sodium carboxymethylhydroxyethyl cellulose; and an ink receiving layer present on the side of each of the two oil absorbing layers away from the substrate.

3. A material in accordance with claim 2 where the halogenated rubber is chlorinated rubber with an amount of chlorination from about 25 to about 75 percent by weight.

4. A material in accordance with claim 2 wherein the styrene-diene copolymers are selected from the group consisting of styrene-butadiene-styrene triblock copolymers, styrene-(ethylene butylene)-styrene triblock copolymer, and styrene-butadiene star triblock copolymers with a styrene content of from about 25 percent by weight to about 75 percent by weight.

5. A material in accordance with claim 2 wherein the substrate is of a thickness of from about 50 to about 125 microns, the oil absorbing layer is of a thickness of from about 2 to about 10 microns, and the ink receiving layer is of a thickness of from about 1 to about 5 microns.

6. A material in accordance with claim 2 wherein the ink receiving layer contains fillers.

7. A material in accordance with claim 6 wherein the fillers are comprised of colloidal silicas, calcium carbonate, titanium dioxide, or mixtures thereof.

8. A material in accordance with claim 7 wherein the fillers or mixtures thereof are present in an amount of from 2 to about 25 percent by weight of the ink receiving layer.

9. A material in accordance with claim 1 wherein the supporting substrate is selected from the group consisting of cellulose acetate, poly(sulfone), poly(propylene), poly(vinyl chloride) and poly(ethylene terephthalate).

10. A material in accordance with claim 1 wherein the oil absorbing layer and the ink receiving layer are present on both sides of the substrate.

11. A material in accordance with claim 1 wherein the transparent substrate is selected as an image receiving sheet for Dot Matrix printing processes.

12. A transparency in accordance with claim 2 wherein the oil absorbing polymer layer is comprised of a styrene-(ethylenebutylene)-styrene triblock copolymer with a styrene content of about 29 percent by weight.

13. A transparency in accordance with claim 1 wherein the oil absorbing polymer layer is comprised of a styrene-(ethylenebutylene)-styrene triblock copolymer with a styrene content of about 29 percent by weight.

14. A material in accordance with claim 2 wherein the supporting substrate is selected from the group consisting of cellulose acetate, poly(sulfone), poly(propylene), poly(vinyl chloride) and poly(ethylene terephthalate).

* * * * *